US009355195B2

United States Patent
Feldmann et al.

(10) Patent No.: US 9,355,195 B2
(45) Date of Patent: May 31, 2016

(54) AUTOMATIC CALIBRATION OF A MODEL FOR A COMPLEX FLOW SYSTEM

(71) Applicant: International Business Machines Corporation, Armonk, NY (US)

(72) Inventors: Peter Feldmann, New York, NY (US); Ying Liu, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 522 days.

(21) Appl. No.: 13/853,415

(22) Filed: Mar. 29, 2013

(65) Prior Publication Data

US 2014/0297233 A1    Oct. 2, 2014

(51) Int. Cl.
G06F 7/60 (2006.01)
G06F 17/10 (2006.01)
G06F 17/50 (2006.01)

(52) U.S. Cl.
CPC ............ *G06F 17/50* (2013.01); *G06F 17/5009* (2013.01)

(58) Field of Classification Search
CPC .............................. G06F 17/50; G06F 17/5009
USPC ............................................................. 703/2
See application file for complete search history.

(56) References Cited

U.S. PATENT DOCUMENTS

| 5,955,659 A * | 9/1999 | Gupta et al. ............... 73/54.01 |
| 6,151,566 A * | 11/2000 | Whiffen ......................... 703/10 |
| 2003/0093236 A1* | 5/2003 | Wu ........................ G06N 3/126 702/85 |

FOREIGN PATENT DOCUMENTS

| CN | 1750156 A | 3/2006 |
| CN | 101694677 A | 4/2010 |
| CN | 101626355 B | 11/2012 |

OTHER PUBLICATIONS

P. Eckert, S. Kamphausen, R. Irmscher, J. Gotthardt, "The significance of transient flow conditiond for well capture zone delineation of bank filtration well fields" Proceedings of ModelCARE 2002, Jun. 2002, IAHS Publ. No. 277.2002, pp. 183-189.*

Brett F. Sanders, Nikolaos D. Katopodes, "Adjoint Sensitivity Analysis for Shallow-Water Wave Control" Journal of Engineering Mechanics Sep. 2000, pp. 909-919.*

English Translation of CN1750156A, "Method for regulating digital filter and relative device," dated Mar. 22, 2006.

English Translation of CN101626355A, "Calibration device and calibration method of multi-input multi-output (MIMO) terminal," dated Jan. 13, 2010.

(Continued)

*Primary Examiner* — Dwin M Craig
(74) *Attorney, Agent, or Firm* — Kelly Kordzik; Matheson Keys Daffer & Kordzik PLLC (57) ABSTRACT

Aspects of the present invention provide a solution for calibrating a model of a complex flow system. In an embodiment, a comparison is made between the output from the model and a set of observed values for each of a plurality of nodes in the complex flow system. An adjoint sensitivity is computed for each of the nodes based on the comparison. These computed adjoint sensitivities are used to adjust a set of coefficients of the models. This calibration process can be performed multiple times, periodically and/or continuously to maximize the accuracy of the model.

21 Claims, 8 Drawing Sheets

(56) References Cited

OTHER PUBLICATIONS

English Translation of CN101694677A, "Logic verification method, device and system," dated Apr. 14, 2010.

State Intellectual Property Office of the P.R. CHINA/ISA/CN, International Search Report and the Written Opinion of the International Searching Authority, International Application No. PCT/IB2014/060210, dated Dec. 31, 2014.

* cited by examiner

AUTOMATIC CALIBRATION OF A MODEL FOR A COMPLEX FLOW SYSTEM

TECHNICAL FIELD

The subject matter of this invention relates generally to data modeling. More specifically, aspects of the present invention provide a solution for calibrating a data model that describes the behavior of a complex flow system, such as a river network, a power utility delivery network, and/or the like.

BACKGROUND

A flow system is set of paths through which a substance passes, such as from one point to another. Some flow systems, called complex flow systems, can have one or more complexities that affect the flow of the substance. These complexities may include such factors as multiple sources of entry for the substance to enter the system and/or variations that exist between various points (called nodes) in the system. One example of a complex flow system is a river system, which can have such complexities as one or more main channels, which may have nodes with varying cross-sections, slopes, curves, obstructions, and/or the like and/or a set of tributaries that feed the main channel or channels.

Because of the inherent complexities, it can be difficult to track the flow of a substance through a complex flow system. In order to characterize such a complex process, mathematical models, which are defined by a series of equations, input variables and coefficients, can be used. Such models can be developed by calculating flow through a node based on flow from a previous node combined with data regarding the physical features found at the node using a mathematical description of the flow system. Such models often utilize nonlinear partial differential equations based on a set of factors that are meant to represent the features found at each of the nodes.

Unfortunately, most models fail to perfectly forecast the particulars of the flow system in all situations. Rather, some or all of the inputs that are used in these models can contain sources of uncertainty, including, but not limited to: measuring errors, incomplete data, incorrect cause/effect assumptions, etc. Further, the complex flow system itself can change over time (e.g., obstructions, erosion and/or the like, in the case of a river system). Such changes can cause even a model that initially performs relatively accurately to become more and more inaccurate as time elapses. Because of this, mathematical models of complex flow systems often need to be calibrated.

SUMMARY

In general, aspects of the present invention provide a solution for calibrating a model of a complex flow system. In an embodiment, a comparison is made between the output from the model and a set of observed values for each of a plurality of nodes in the complex flow system. An adjoint sensitivity is computed for each of the nodes based on the comparison. These computed adjoint sensitivities are used to adjust a set of coefficients of the models. This calibration process can be performed multiple times, periodically and/or continuously to maximize the accuracy of the model.

A first aspect of the invention provides a method for calibrating a model of a complex flow system, comprising: making a comparison between an output from the model and an observed value for each of a plurality of nodes in the complex flow system; computing an adjoint sensitivity for each of the nodes based on the comparison; adjusting a set of coefficients of the model based on the adjoint sensitivity; computing a second adjoint sensitivity for each of the nodes based on a second comparison of the output from the adjusted model and a second set of observed values; and readjusting the set of coefficients based on the second adjoint sensitivity.

A second aspect of the invention provides a system for calibrating a model of a complex flow system, comprising at least one computer device that performs a method, comprising: making a comparison between an output from the model and an observed value for each of a plurality of nodes in the complex flow system; computing an adjoint sensitivity for each of the nodes based on the comparison; adjusting a set of coefficients of the model based on the adjoint sensitivity; computing a second adjoint sensitivity for each of the nodes based on a second comparison of the output from the adjusted model and a second set of observed values; and readjusting the set of coefficients based on the second adjoint sensitivity.

A third aspect of the invention provides a computer program product stored on a computer readable storage medium, which, when executed performs a method for calibrating a model of a complex flow system, comprising: making a comparison between an output from the model and an observed value for each of a plurality of nodes in the complex flow system; computing an adjoint sensitivity for each of the nodes based on the comparison; adjusting a set of coefficients of the model based on the adjoint sensitivity; computing a second adjoint sensitivity for each of the nodes based on a second comparison of the output from the adjusted model and a second set of observed values; and readjusting the set of coefficients based on the second adjoint sensitivity.

A fourth aspect of the invention provides a method for deploying an application for calibrating a model of a complex flow system, comprising: providing a computer infrastructure being operable to: make a comparison between an output from the model and an observed value for each of a plurality of nodes in the complex flow system; compute an adjoint sensitivity for each of the nodes based on the comparison; adjust a set of coefficients of the model based on the adjoint sensitivity; compute a second adjoint sensitivity for each of the nodes based on a second comparison of the output from the adjusted model and a second set of observed values; and readjust the set of coefficients based on the second adjoint sensitivity.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

The inventors of the present invention have discovered that the current way of calibrating models of complex flow systems can be improved. Currently, an expert in the type of complex flow system, such as an experienced hydrologist in the case of a river system, must often be consulted. Such an expert might first look at the differences between the simulation data and the actual data. Then the expert might physically travel to visit nodes in the flow system in an attempt to determine where discrepancies may originate. Based on these factors, the expert might use intuition to make adjustments to the model. This human-based process might need to be repeated numerous times, which could cost unnecessary time and resources.

Alternatively, an expert in the type of complex flow system can randomly select a model coefficient at one node and make an arbitrary change. The simulation can then be repeated based on the change and the output of the randomly modified complex flow system can be compared with the observation. If, in this scenario, the output is found to be closer to the observation than the original output, the modified complex flow system model is accepted. Otherwise the modified model is rejected. However, the above solution suffers from its random search methods, which may have to be repeated numerous times and require large quantities of computer resources.

Alternatively, an expert in the complex flow system can calibrate the model by computing direct sensitivity. In this case, the expert will have to change the model coefficient at one node only, while keeping the coefficients at all remaining nodes unchanged. The modified model will be simulated again and the difference between the computed output and the observation would be compared to compute the direct sensitivity. This process would have to be repeated for each node in the complex flow system. However, a drawback of this solution is that for many large complex flow systems, this process can require a large amount of computing resources. For example, if there are 4,000 nodes in the complex flow system, 4,001 direct sensitivity computing processes will have to be performed in order to compute the sensitivities at each of the 4,000 nodes.

As indicated above, aspects of the present invention provide a solution for calibrating a model of a complex flow system. In an embodiment, a comparison is made between the output from the model and a set of observed values for each of a plurality of nodes in the complex flow system. An adjoint sensitivity is computed for each of the nodes based on the comparison. These computed adjoint sensitivities are used to adjust a set of coefficients of the models. This calibration process can be performed multiple times, periodically and/or continuously to maximize the accuracy of the model.

Figure 1:
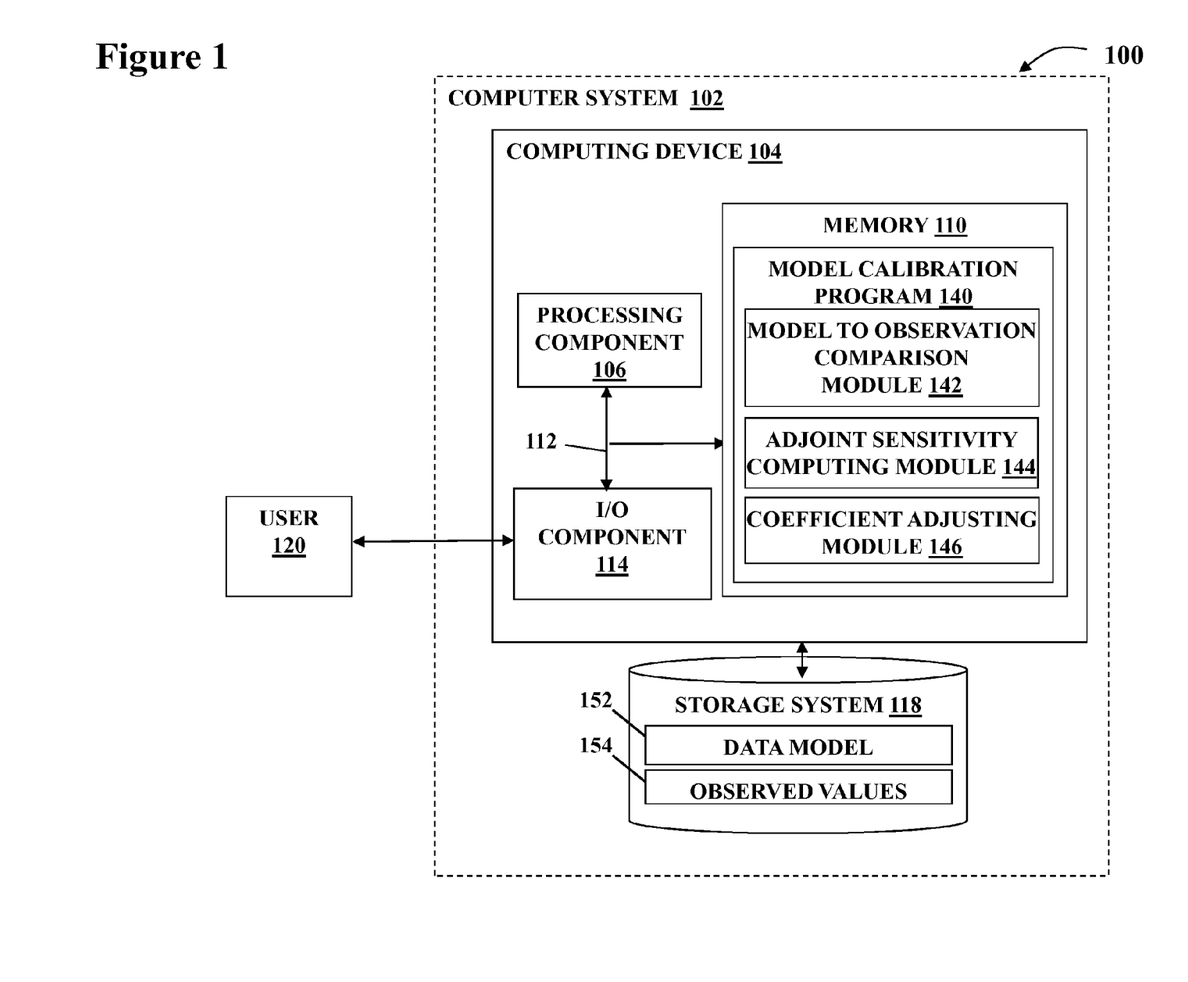
FIG. 1 shows an illustrative computer system according to embodiments of the present invention.

Turning to the drawings, FIG. 1 shows an illustrative environment 100 for calibrating a complex flow system model. To this extent, environment 100 includes a computer system 102 that can perform a process described herein in order to calibrate a complex flow system model. In particular, computer system 102 is shown including a computing device 104 that includes a model calibration program 140, which makes computing device 104 operable to calibrate a complex flow system model by performing a process described herein.

Computing device 104 is shown including a processing component 106 (e.g., one or more processors), a memory 110, a storage system 118 (e.g., a storage hierarchy), an input/output (I/O) component 114 (e.g., one or more I/O interfaces and/or devices), and a communications pathway 112. In general, processing component 106 executes program code, such as model calibration program 140, which is at least partially fixed in memory 110. To this extent, processing component 106 may comprise a single processing unit, or be distributed across one or more processing units in one or more locations.

Memory 110 also can include local memory, employed during actual execution of the program code, bulk storage (storage 118), and/or cache memories (not shown) which provide temporary storage of at least some program code in order to reduce the number of times code must be retrieved from bulk storage 118 during execution. As such, memory 110 may comprise any known type of temporary or permanent data storage media, including magnetic media, optical media, random access memory (RAM), read-only memory (ROM), a data cache, a data object, etc. Moreover, similar to processing component 116, memory 110 may reside at a single physical location, comprising one or more types of data storage, or be distributed across a plurality of physical systems in various forms.

While executing program code, processing component 106 can process data, which can result in reading and/or writing transformed data from/to memory 110 and/or I/O component 114 for further processing. Pathway 112 provides a direct or indirect communications link between each of the components in computer system 102. I/O component 114 can comprise one or more human I/O devices, which enable a human user 120 to interact with computer system 102 and/or one or more communications devices to enable a system user 120 to communicate with computer system 102 using any type of communications link.

To this extent, model calibration program 140 can manage a set of interfaces (e.g., graphical user interface(s), application program interface, and/or the like) that enable human and/or system users 120 to interact with model calibration program 140. Users 120 could include system administrators and/or clients who need to store and/or calibrate a complex flow system model in a storage system environment, among others. Further, model calibration program 140 can manage (e.g., store, retrieve, create, manipulate, organize, present, etc.) the data in storage system 118, including, but not limited to a business domain vocabulary 152, a statistical vocabulary 154, and/or a dataset description 156, using any solution.

In any event, computer system 102 can comprise one or more computing devices 104 (e.g., general purpose computing articles of manufacture) capable of executing program code, such as model calibration program 140, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, model calibration program 140 can be embodied as any combination of system software and/or application software. In any event, the technical effect of computer system 102 is to provide processing instructions to computing device 104 in order to calibrate a complex flow system model.

Further, model calibration program 140 can be implemented using a set of modules 142-146. In this case, a module 142-146 can enable computer system 102 to perform a set of tasks used by model calibration program 140, and can be separately developed and/or implemented apart from other portions of model calibration program 140. As used herein, the term "component" means any configuration of hardware, with or without software, which implements the functionality described in conjunction therewith using any solution, while the term "module" means program code that enables a computer system 102 to implement the actions described in conjunction therewith using any solution. When fixed in a memory 110 of a computer system 102 that includes a processing component 106, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 102.

When computer system 102 comprises multiple computing devices 104, each computing device 104 can have only a portion of model calibration program 140 fixed thereon (e.g., one or more modules 142-146). However, it is understood that computer system 102 and model calibration program 140 are only representative of various possible equivalent computer systems that may perform a process described herein. To this extent, in other embodiments, the functionality provided by computer system 102 and model calibration program 140 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 102 includes multiple computing devices 104, the computing devices can communicate over any type of communications link. Further, while performing a process described herein, computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, model calibration program 140 enables computer system 102 to calibrate a complex flow system model. To this extent, model calibration program 140 is shown including a model to observation comparison module 142, an adjoint sensitivity computing module 144 and a coefficient adjusting module 146.

Figure 2:
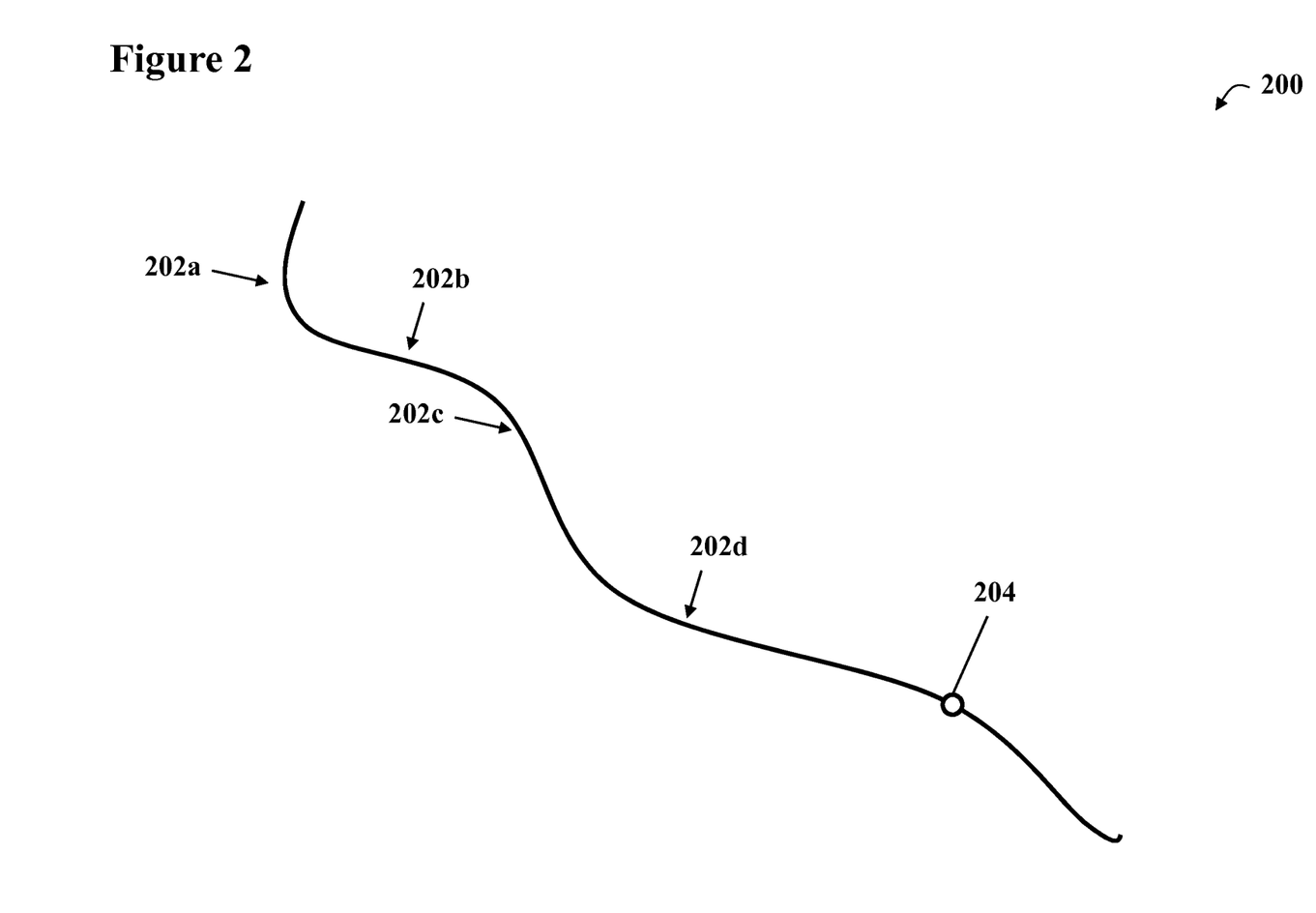
FIG. 2 shows a complex flow system according to embodiments of the invention.

Referring now to FIG. 2, a complex flow system 200 according to embodiments of the invention is shown. In an embodiment, complex flow system 200 is a river system through which water flows. In other embodiments, complex flow system 200 can be an electrical distribution system, a wind flow system, and/or any other type of system through which a substance flows from one point to another.

In any case, as illustrated, complex flow system 200 has one or more nodes 202a-d through which the substance in the complex flow system 200 can flow. Nodes 202a-d can represent points in complex flow system 200 at which a measurement of the substance (i.e., amount of substance, rate of flow, etc.) is desired. For example, any or all of nodes 202a-d could represent a point at which one or more characteristics may vary from characteristics at one or more other nodes. For example, in case of a river system, one or more nodes 202a-d could represent a point at which a tributary enters the main system, the depth changes, the width changes, an obstruction occurs, and/or the like. Similarly, in a wind flow system, one or more nodes 202a-d could represent a point at which the elevation varies, one or more physical features in the land varies, a building or other obstruction exists, and/or the like. Likewise, in an electrical distribution system, one or more nodes 202a-d could represent a junction, a point at which flow capacity changes, etc.

Whatever the case, complex flow system 200 can also have one or more sensor locations 204. A sensor location 204 can be separate from nodes 202a-d, as illustrated in FIG. 2. Additionally or in the alternative, a sensor location 204 can occur at the some point in complex system 200 as a node 202a-d. In any case, sensor location 204 is a location at which one or more sensors for measuring flow of the substance through complex flow system 200 is located. To this extent, one or more sensors at sensor location 204 can measure anything regarding the complex flow system 200 for which data is desired, including, but not limited to capacity, flow, and/or the like.

Figure 3:
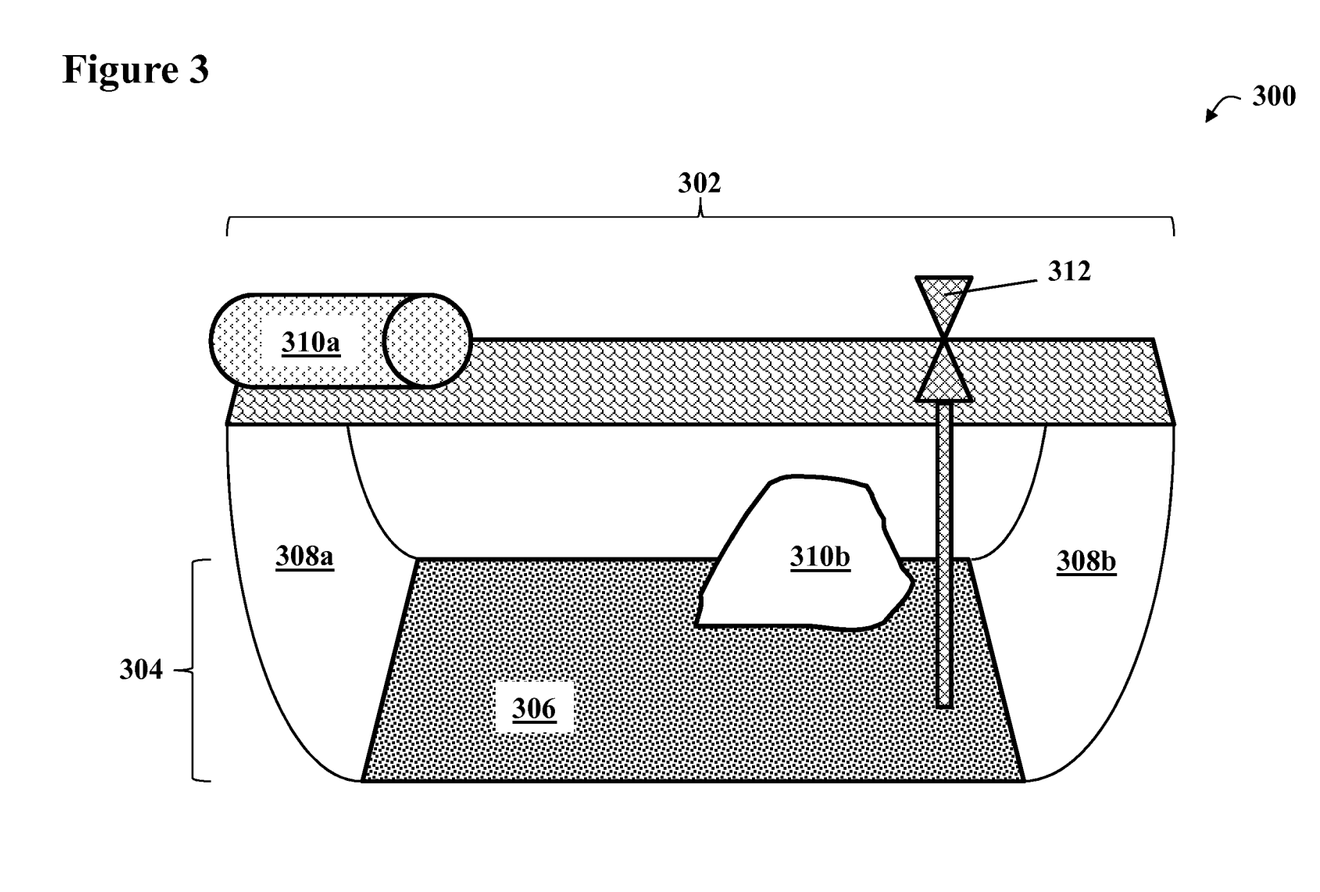
FIG. 3 shows an example cross section of a node according to embodiments of the invention.

Turning now to FIG. 3, an example cross section 300 of a node 202a-d (FIG. 2) in complex flow system 200 according to an embodiment is shown. As illustrated, cross section 300 is a node 202a-d in a river system. To this extent, cross section 300 has a capacity 302. Capacity 302 indicates the physical limits of the cross section 300 within which the substance (in this case water) is flowing. In the case, as illustrated, of a river system, capacity 302 could be measured based on a width and/or depth of the channel, contours of the sides 308a, 308b of the channel, and/or the like. Further, cross section 300 can also have an impelling force 304 (e.g., a slope of the river bed in the case of a river system), which indicates an amount of force with which the substance flows through the cross section 300. Still further, cross section 300 can have a resistance (not shown). This resistance, in the case of the illustrated river system cross section 300 can include friction due to the make-up of a river bed 306 and/or sides 308a-b. Further, this resistance can include friction (slowing influences) due to obstructions, e.g., the log 310a and/or the rock 310b shown in the illustration. Any or all of the capacity 302, the impelling force 304 or the resistance (friction) can be used as parameters in a modeling equation used to predict the behavior of the complex system 200 (FIG. 2) at the node 202a-d at which the cross section 300 can be found or at other points in the complex system.

Referring now to FIG. 1 in conjunction with FIGS. 2 and 3, computer system 102, executing the model to observation comparison module 142, makes a comparison between an output from such a mathematical model and one or more observed values at a node 202a-d, such as the one represented by cross-section 300. For example, the observed values could be gathered via sensor 312 that is located at the particular node 202a-d or at another node 202a-d or sensor location 204 in the complex system 200. In the case that the sensor is in a location other than the location of the node 202a-d for which the values are being mathematical model output is being compared, the model output could be part of a cumulative output that affects flow of the complex flow system 200 at the point, such as sensor location 204, at which the sensor 312 that is collecting the observed values is located. To this extent, a sensor 312 located at a single sensor location 204 can be used to make a comparison with model output from a plurality of separately located nodes.

Figure 4:
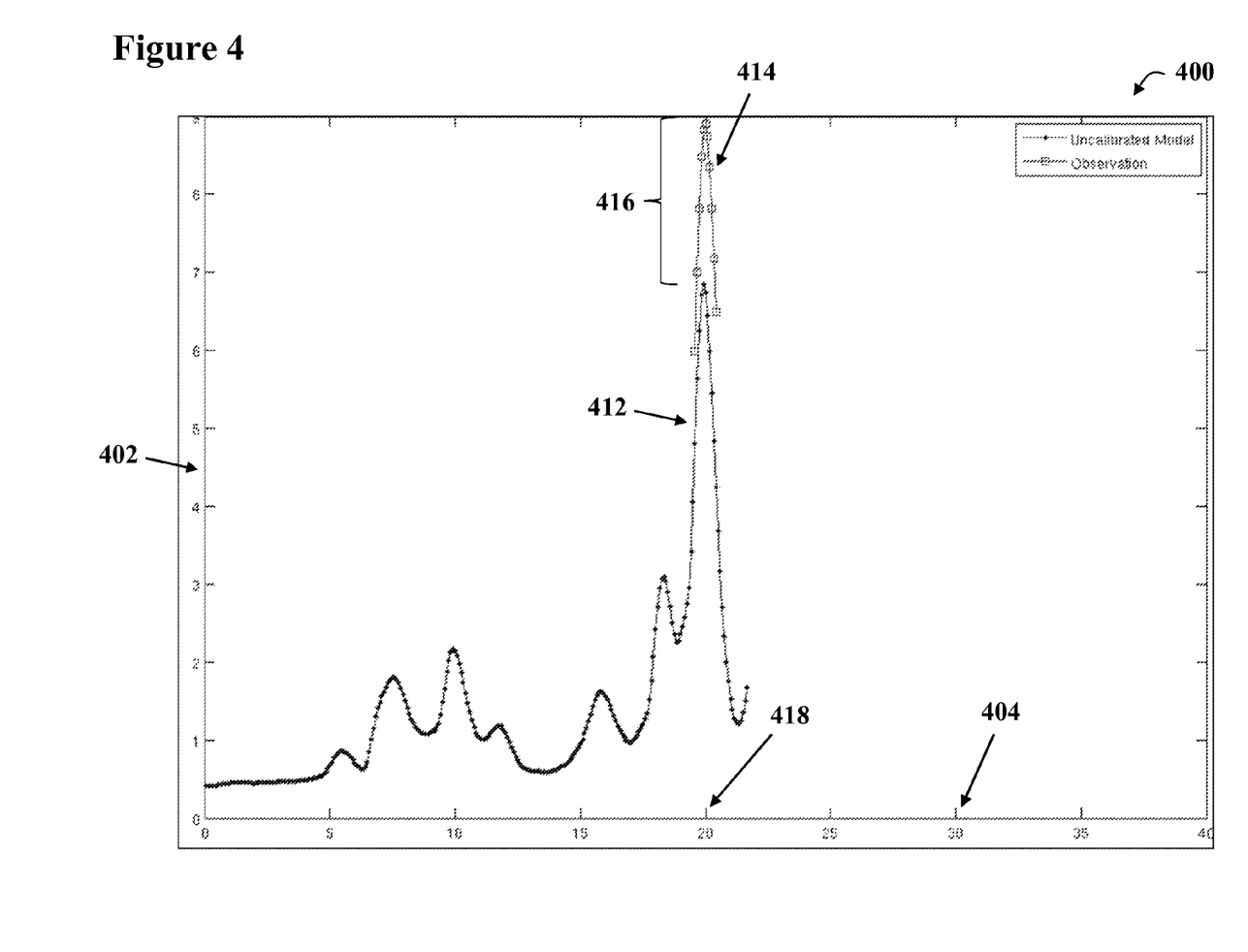
FIG. 4 shows an example graph according to embodiments of the invention.

Turning now to FIG. 4, an example graph 400 according to embodiments of the invention is shown. Graph 400 can be used to visually demonstrate the comparison between the output of the mathematical model and the observed values. To this extent, graph 400 can plot the values 402 of both the mathematical model and the observed values over time 404. As illustrated, graph 400 has a first set of values that represent model output data 412 (e.g., using parameters as described above). Graph 400 also has a second set of values that represent observed value data 414 that correspond to the model output data 412. However, in the illustrated graph 400, it is clear that the observed data 414 does not match the model output data 412 that had been predicted by the model. Rather, a difference 416 between the model output data 412 and the observed data 414 exists at a particular point in time 418.

Referring now to FIG. 1 in conjunction with FIG. 4, computer system 102, executing adjoint sensitivity computing module 144, computes the adjoint sensitivity for one or more nodes based on the comparison performed by model to observation comparison module 142. Adjoint sensitivity computing module 144 can compute the adjoint sensitivity for a single node, a plurality of nodes or all nodes simultaneously. For example, each of the model output data 412 and the observed data 414 illustrated in graph 400 can be defined as a mathematical function. For example, as both the model output data 412 and the observed data 414 can be seen to be non-linear, each can be defined as a strongly nonlinear partial differential equation. These two functions can be said to be adjoint functions, that is, functions that are related to one another. However, because of the differences (e.g., difference 416) in the model output data 412 and the observed data 414, these functions will not be identical. Rather, a certain adjoint sensitivity will exist between the functions.

In an embodiment, the operation of computing of the adjoint sensitivity can be described as follows, we can assume that the behavior of the complex flow system model at the observation point can be described by Y. The difference between the observation and the model output can be described by m. Accordingly, m can be defined as a function of Y. Hence:

$$m=H(Y)$$

The adjoint sensitivity computation can be carried out by two steps. The first step can be performed looking forward. The trajectory, which consists of all internal solutions at all time points are stored in the memory is denoted as G. It is assumed that parameters at all nodes are denoted in array p. The adjoint sensitivity is an array which can be denoted as $$\frac{\partial m}{\partial p}.$$

In the second step, the complex flow system is solved backwards. The stored trajectory of the first step, G, is used to solve:

$$\left(\frac{\partial G}{\partial Y}\right)^T X_a = \left(\frac{\partial G}{\partial p}\right)^T$$

Once the backward solution $X_a$ is computed, the adjoint solution of all nodes can be computed as:

$$\frac{\partial m}{\partial p} = -X_a^T \frac{\partial G}{\partial p} + \frac{\partial H}{\partial p}$$

From the above description, it should be clear to those skilled in the art that only two steps are necessary to compute the adjoint sensitivities at a single node, a plurality of nodes and/or all nodes in a complex flow system. It should also be understood that it is not necessary for the forward solution to be first and the backward solution to be second, but that the solutions can instead be reversed.

A sensitivity analysis can apportion the uncertainty in the mathematical model (e.g., the difference 416 between the adjoint functions representing the model output and the observed values) to one or more sources of uncertainty in the inputs. These adjoint sensitivities can be computed, e.g., based on one or more of the coefficients in the mathematical model to determine where the sensitivity between the adjoint functions occurs. In order to simplify the computation, one of the model coefficients can be designated as the coefficient on which the sensitivity is computed. For example, in a river system, an adjoint sensitivity can be calculated based on a friction coefficient. Such a designation can allow for a "fine-tuning" of the mathematical model without the possibly complex interactions that can occur when multiple coefficients are manipulated simultaneously.

In any event, referring back to FIG. 1 in conjunction with FIG. 4, coefficient adjusting module 146, as executed by computer system 102, adjusts one or more coefficients of the model associated with the node based on the adjoint sensitivity. This coefficient adjusting serves to decrease the sensitivities between the adjoint functions representing the model output and the observed values. To this extent, the adjusting brings the model output closer to the actual observed values. If a single model coefficient has been designated as the coefficient on which the sensitivity is computed, such as friction in a river model, this single coefficient can be adjusted in isolation. In any case, coefficient adjusting module 146 can adjust the coefficient using any solution now known or later developed. In an embodiment, coefficient adjusting module 146 can use a quasi-Newton scheme to adjust the coefficient(s).

Once the one or more coefficients have been adjusted, the model can be rerun and the output data can again be compared to the observed data; the adjunct sensitivity can again be computed for the node; and further adjustments to the coefficient(s) can be made. Continued iterations of this process can be performed for the node until a predetermined sensitivity tolerance is reached. Further, similar iterations of this process can be performed at any of all other computational nodes in the complex flow system.

Figure 5:
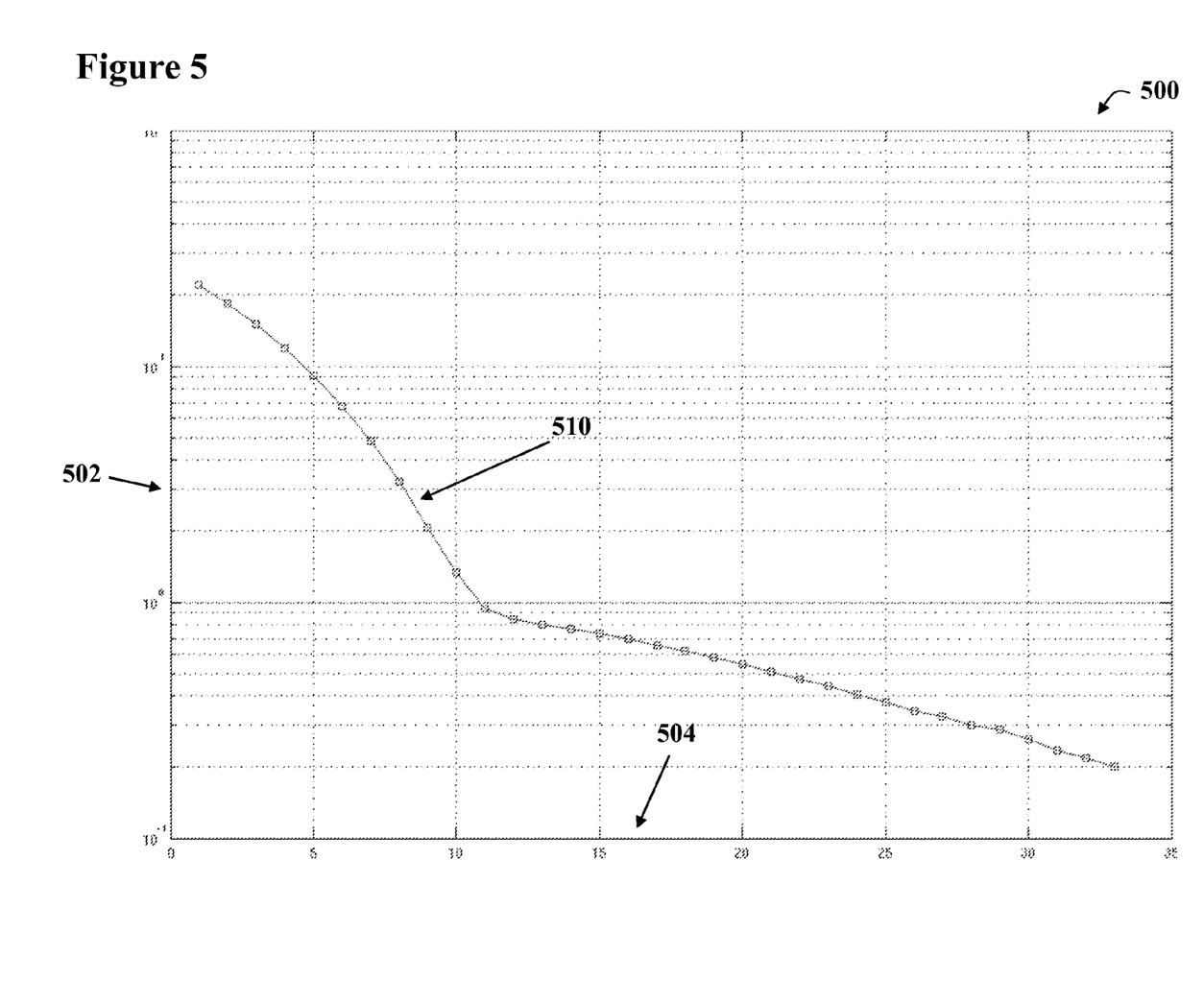
FIG. 5 shows an example graph according to embodiments of the invention.

Turning now to FIG. 5, an example graph 500 according to embodiments of the invention is shown. Graph 500 can be thought of as illustrating a convergence in sensitivity 502 of the functions represented by the model set of values 412 and the observed set of values 414 over a number of iterations 504. As shown, a set of sensitivity values 510 indicate that the sensitivities 502 between the two adjoint functions are decreasing by orders of magnitude adjustments are made to the coefficient(s) over a number of iterations 504.

Figure 6:
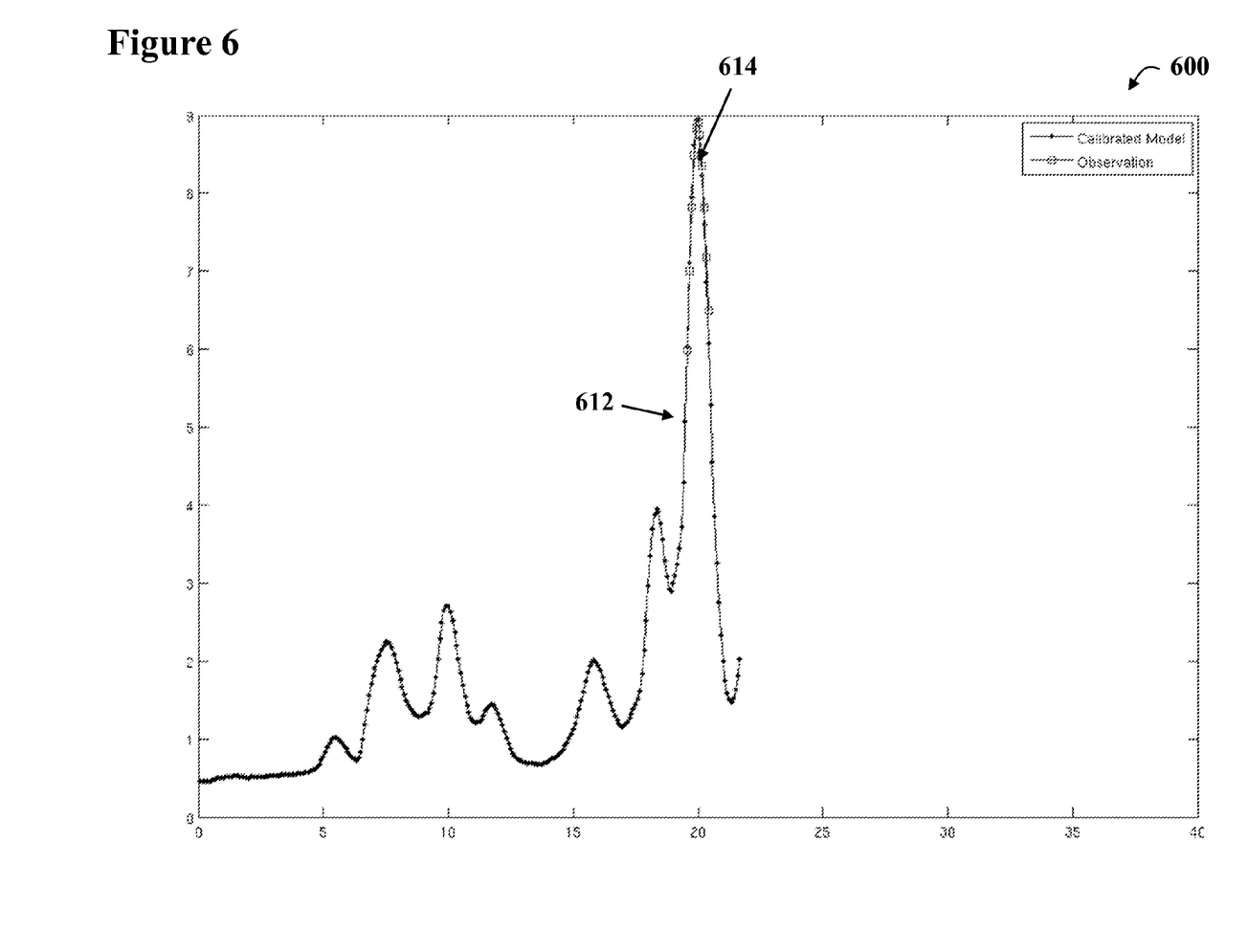
FIG. 6 shows an example graph according to embodiments of the invention.

Turning now to FIG. 6, in conjunction with FIG. 4, an example graph 600 according to embodiments of the invention is shown. Graph 600 illustrates a comparison of model output data 612 and observation data 614. As shown, the model output data 612 now more closely follows the observation data 614. As such, the difference 416 between the model output data 412 and the observation data 414 in the graph 400 that illustrates the data pre-adjustment has been substantially removed.

Figure 7:
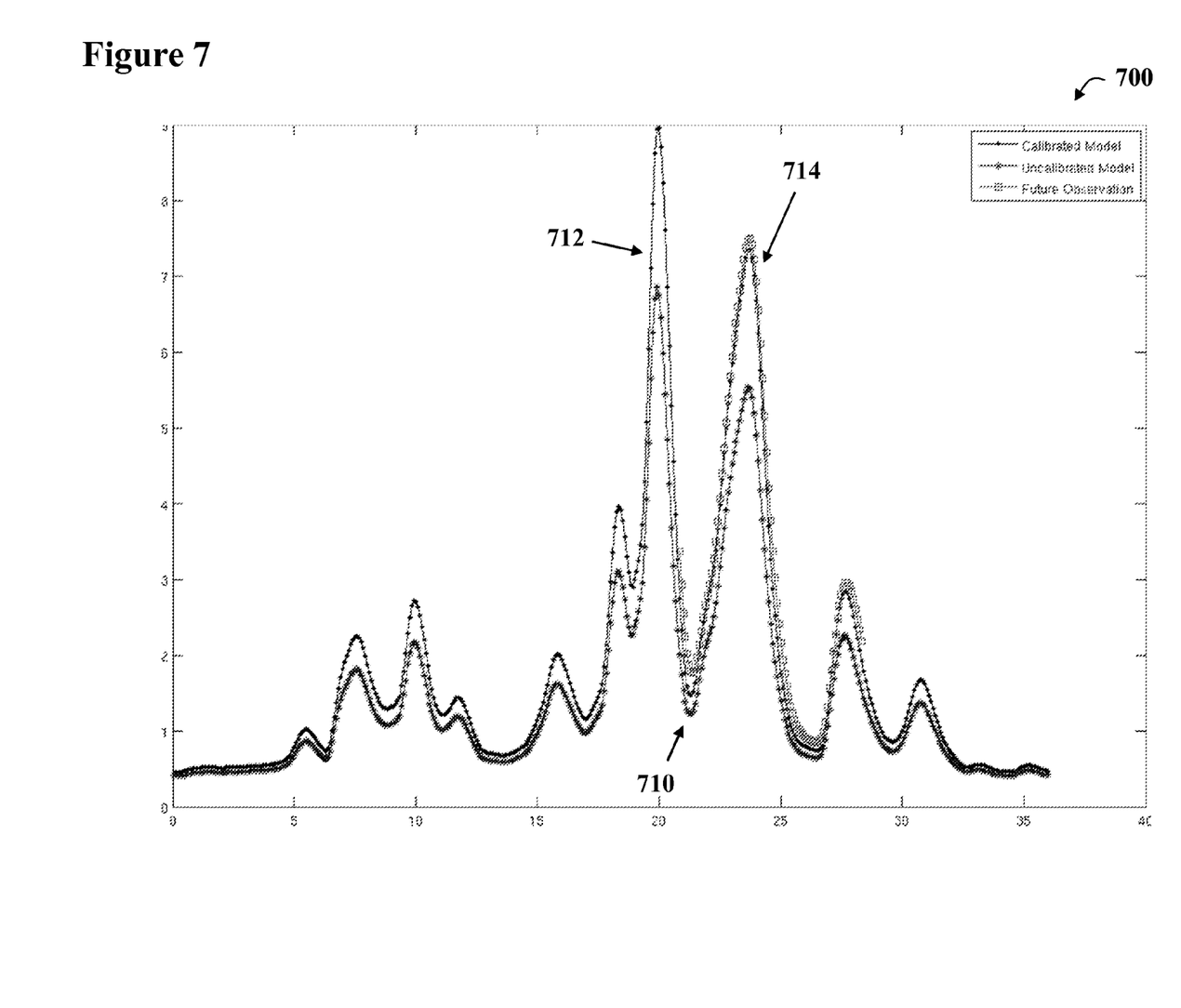
FIG. 7 shows an example graph according to embodiments of the invention.

Turning now to FIG. 7, in conjunction with FIGS. 4 and 6, an example graph 700 according to embodiments of the invention is shown. Graph 700 illustrates a comparison of model output data 712 and observation data 714 going forward in time from the adjustment of the coefficient(s). In addition, graph 700 shows the previous model output data 710 (as reflected in model output data 412 of graph 400) prior to adjustment of the coefficient(s). Note that the new model output data 712 continues to substantially track with the new observation data 714 while the previous model output data 710 experiences continued differences with respect the new observation data 714. As shown, the model output data 612 now more closely follows the observation data 614. If should be understood that if a comparison between the new model output data 712 and even newer data observations were to show differences, then the above processes could be preformed again to recalibrate the model.

Figure 8:
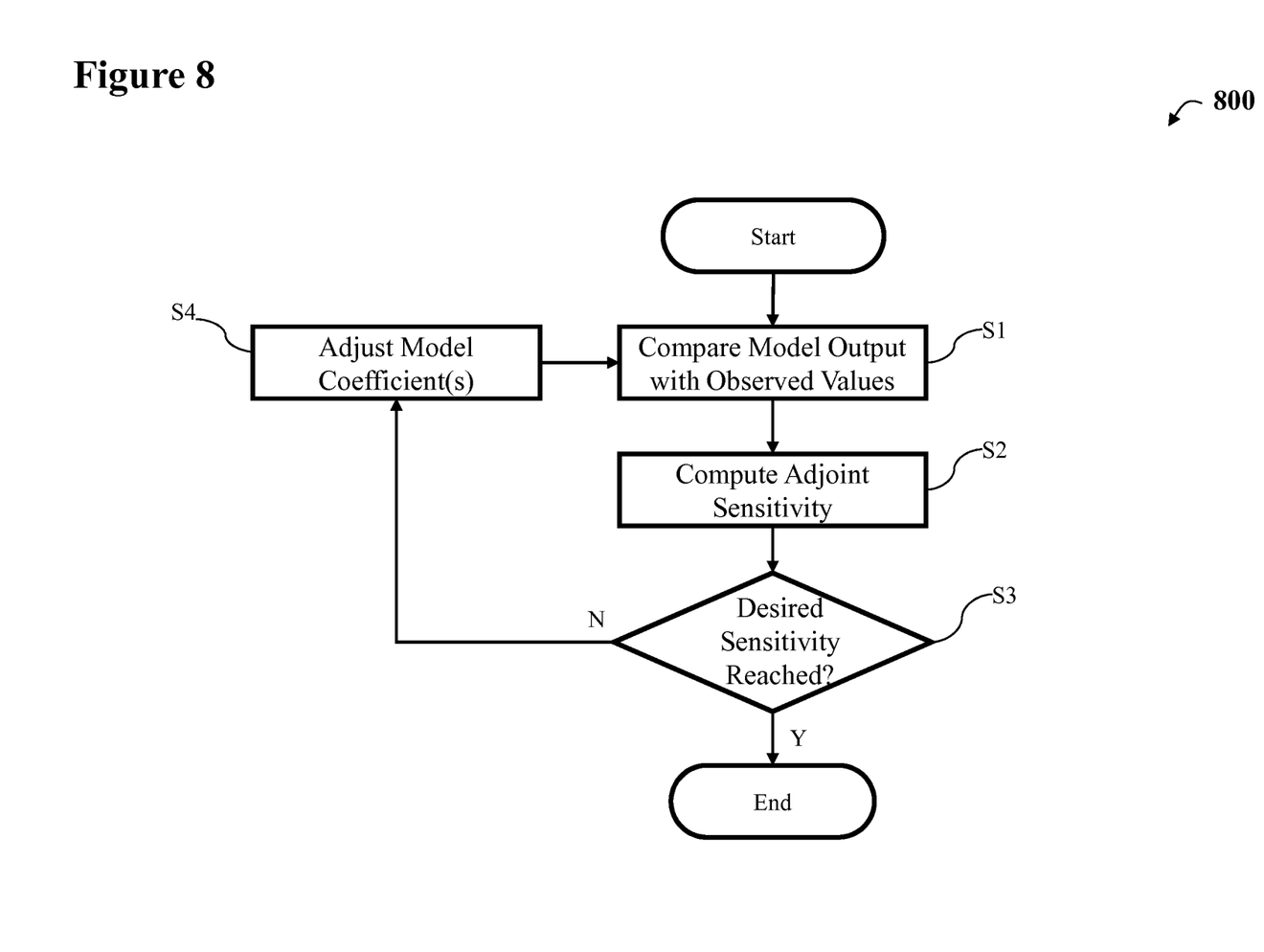
FIG. 8 shows an example flow diagram according to embodiments of the invention.

Turning now to FIG. 8, an example flow diagram according to embodiments of the invention is shown. As illustrated in FIG. 8 in conjunction with FIG. 1 and FIG. 4, in S1, model to observation comparison module 142, as executed by computer system 102, makes a comparison between model output data 412 and observed value data 414 for a node. This node can be one of a plurality of nodes 202a-d (FIG. 2) in a complex flow system 200. In S2, adjoint sensitivity computing module 144, as executed by computer system 102, computes an adjoint sensitivity for the first node based on the comparison. This computing can be accomplished by creating a function corresponding to each of the model output data 412 and the observed value data 414. These functions can be strongly nonlinear partial differential equations, and can yield adjoint functions, for which the adjoint sensitivity can be computed. In S3, a determination is made as to whether a predetermined desired sensitivity has been reached. If the determination is that the desired sensitivity has been reached, processing ends. Otherwise, in S4, coefficient adjusting module 146, as executed by computer system 102, adjusts one or more coefficients of the model associated with the first node based on the adjoint sensitivity computed in S2 and processing returns to S1.

While shown and described herein as a method and system for calibrating a complex flow system model, it is understood that aspects of the invention further provide various alternative embodiments. For example, in one embodiment, the invention provides a computer program fixed in at least one computer-readable medium, which when executed, enables a computer system to calibrate a complex flow system model. To this extent, the computer-readable medium includes program code, such as model calibration program 140 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; and/or the like.

In another embodiment, the invention provides a method of providing a copy of program code, such as model calibration program 140 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for calibrating a complex flow system model. In this case, a computer system, such as computer system 102 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The terms "first," "second," and the like, if and where used herein do not denote any order, quantity, or importance, but rather are used to distinguish one element from another, and the terms "a" and "an" herein do not denote a limitation of quantity, but rather denote the presence of at least one of the referenced item. The modifier "approximately", if and where used in connection with a quantity is inclusive of the stated value and has the meaning dictated by the context, (e.g., includes the degree of error associated with measurement of the particular quantity). The suffix "(s)" if and where used herein is intended to include both the singular and the plural of the term that it modifies, thereby including one or more of that term (e.g., the metal(s) includes one or more metals).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for calibrating a model of a complex flow system, comprising:
    making a comparison between an output from the model and an observed value for a node of a plurality of nodes in the complex flow system;
    computing an adjoint sensitivity for the node based on the comparison; and
    adjusting a set of coefficients of the model associated with the node based on the adjoint sensitivity, wherein the complex flow system includes a flow of water in a river system and wherein the set of coefficients includes a capacity coefficient, a slope coefficient and a friction coefficient.

2. The method of claim 1, wherein the computing computes the adjoint sensitivity for a plurality of nodes simultaneously.

3. The method of claim 1, wherein the observed value is collected from an embedded sensor within the complex flow system.

4. The method of claim 1, wherein the observed value is one of a set of observed values in a stream of observed values collected by the embedded sensor in real time.

5. The method of claim 1, wherein the adjusting and the readjusting of the set of coefficients is performed using a quasi-Newton method.

6. The method of claim 1, wherein a friction component is adjusted during the adjusting and the readjusting of the set of coefficients.

7. The method of claim 1, further comprising:
making a comparison between the output from the model and an observed value of a second node of a plurality of nodes in the complex flow system;
computing an second adjoint sensitivity for the second node based on the comparison; and
adjusting a set of coefficients of the model associated with the second node based on the second adjoint sensitivity.

8. A system for calibrating a complex flow system model, comprising at least one computer device that performs a method, comprising:
making a comparison between an output from the model and an observed value for a node of a plurality of nodes in the complex flow system;
computing an adjoint sensitivity for the node based on the comparison; and
adjusting a set of coefficients of the model associated with the node based on the adjoint sensitivity, wherein the complex flow system includes a flow of water in a river system and wherein the set of coefficients includes a capacity coefficient, a slope coefficient and a friction coefficient.

9. The system of claim 8, wherein the computing computes the adjoint sensitivity for a plurality of nodes simultaneously.

10. The system of claim 8, wherein the observed value is collected from an embedded sensor within the complex flow system.

11. The system of claim 8, wherein the observed value is one of a set of observed values in a stream of observed values collected by the embedded sensor in real time.

12. The system of claim 8, wherein the adjusting and the readjusting of the set of coefficients is performed using a quasi-Newton method.

13. The system of claim 8, wherein a friction component is adjusted during the adjusting and the readjusting of the set of coefficients.

14. The system of claim 8, the method further comprising:
making a comparison between the output from the model and an observed value of a second node of a plurality of nodes in the complex flow system;
computing an second adjoint sensitivity for the second node based on the comparison; and
adjusting a set of coefficients of the model associated with the second node based on the second adjoint sensitivity.

15. A computer program product stored on a non-transitory computer readable storage medium, which, when executed performs a method for calibrating a complex flow system model, comprising:
making a comparison between an output from the model and an observed value for a node of a plurality of nodes in the complex flow system;
computing an adjoint sensitivity for the node based on the comparison; and
adjusting a set of coefficients of the model associated with the node based on the adjoint sensitivity, wherein the complex flow system includes a flow of water in a river system and wherein the set of coefficients includes a capacity coefficient, a slope coefficient and a friction coefficient.

16. The program product of claim 15, wherein the computing computes the adjoint sensitivity for a plurality of nodes simultaneously.

17. The program product of claim 15, wherein the observed value is collected from an embedded sensor within the complex flow system.

18. The program product of claim 15, wherein the observed value is one of a set of observed values in a stream of observed values collected by the embedded sensor in real time.

19. The program product of claim 15, wherein the adjusting and the readjusting of the set of coefficients is performed using a quasi-Newton method.

20. The program product of claim 15 wherein a friction component is adjusted during the adjusting and the readjusting of the set of coefficients.

21. The program product of claim 15, the method further comprising:
making a comparison between the output from the model and an observed value of a second node of a plurality of nodes in the complex flow system;
computing an second adjoint sensitivity for the second node based on the comparison; and
adjusting a set of coefficients of the model associated with the second node based on the second adjoint sensitivity.

* * * * *